(12) United States Patent
Ko et al.

(10) Patent No.: US 10,147,374 B2
(45) Date of Patent: Dec. 4, 2018

(54) LIQUID CRYSTAL DISPLAY DEVICE WITH A STANDBY MODE CONTROLLER FOR STORING A STANDBY SCREEN IMAGE

(71) Applicant: LG DISPLAY CO., LTD., Seoul (KR)

(72) Inventors: NamKon Ko, Seoul (KR); HeeJung Hong, Seoul (KR); JinWoo Cha, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 23 days.

(21) Appl. No.: 14/586,073

(22) Filed: Dec. 30, 2014

(65) Prior Publication Data

US 2015/0187304 A1    Jul. 2, 2015

(30) Foreign Application Priority Data

Dec. 31, 2013  (KR) .................. 10-2013-0169308

(51) Int. Cl.
*G09G 3/36*  (2006.01)
*G09G 3/34*  (2006.01)
*G06F 1/32*  (2006.01)

(52) U.S. Cl.
CPC ......... *G09G 3/3648* (2013.01); *G06F 1/3265* (2013.01); *G09G 3/3406* (2013.01); *G09G 3/3688* (2013.01); *G09G 2310/0245* (2013.01); *G09G 2330/022* (2013.01)

(58) Field of Classification Search
CPC .. G09G 3/3611; G09G 3/3648; G09G 3/3666; G09G 3/3677; G09G 3/3688; G09G 3/3696; G09G 2330/021; G09G 2330/022; G09G 5/02; G09G 2310/0205; G09G 2310/0213; G09G 2310/0245; G09G 2310/0286; G09G 2310/08; G06F 1/32; G06F 1/3203; G06F 1/3206; G06F 1/3265
See application file for complete search history.

(56) References Cited

U.S. PATENT DOCUMENTS

| | | | | |
|---|---|---|---|---|
| 5,854,618 A * | 12/1998 | Kiwiet | ...................... | G06F 3/16 345/214 |
| 5,880,719 A * | 3/1999 | Kikinis | .............. | G03G 15/5075 345/212 |
| 6,404,423 B1 * | 6/2002 | Kivela | ................... | G09G 5/006 345/212 |
| 6,587,101 B2 * | 7/2003 | Yoo | ........................ | G09G 5/006 345/211 |

(Continued)

FOREIGN PATENT DOCUMENTS

CN    101570620 A    11/2009

OTHER PUBLICATIONS

Office Action dated Aug. 3, 2016 for Chinese Application No. 201410820902.X, 9 pages.

*Primary Examiner* — Keith Crawley
(74) *Attorney, Agent, or Firm* — Seed Intellectual Property Law Group LLP

(57) ABSTRACT

A liquid crystal display device is configured to create an aesthetic effect while on low power by performing a single color driving operation in standby mode. The liquid crystal display device further includes a standby mode controller which is provided in the timing controller, in addition to the usual data driver, and runs in standby mode to perform the standby mode function with minimum power consumption.

18 Claims, 6 Drawing Sheets

(56) References Cited

U.S. PATENT DOCUMENTS

| | | | | |
|---|---|---|---|---|
| 7,184,035 | B2* | 2/2007 | Sato | G06F 3/1431 345/213 |
| 2003/0156106 | A1* | 8/2003 | Byun | G09G 5/003 345/212 |
| 2005/0219189 | A1* | 10/2005 | Fukuo | G09G 3/20 345/96 |
| 2005/0268236 | A1* | 12/2005 | Kosaka | G09G 5/363 715/718 |
| 2008/0117158 | A1* | 5/2008 | Kim | G09G 3/2096 345/99 |
| 2009/0273557 | A1* | 11/2009 | Song | G09G 3/3614 345/100 |
| 2010/0085375 | A1* | 4/2010 | Chung | G09G 3/3406 345/589 |
| 2010/0156965 | A1* | 6/2010 | Kim | G09G 3/3688 345/691 |
| 2013/0265340 | A1* | 10/2013 | Ahn | G09G 5/02 345/690 |

* cited by examiner

LIQUID CRYSTAL DISPLAY DEVICE WITH A STANDBY MODE CONTROLLER FOR STORING A STANDBY SCREEN IMAGE

CROSS-REFERENCE TO RELATED APPLICATION

Pursuant to 35 U.S.C. § 119(a), this application claims the benefit of earlier filing date and right of priority to Korean Application No. 10-2013-0169308, filed on Dec. 31, 2013, the contents of which is incorporated by reference herein in its entirety.

BACKGROUND

1. Field of the Disclosure

The present disclosure relates to a liquid crystal display device, and more particularly, to a liquid crystal display device which is configured to create an aesthetic effect while on low power by performing a single color driving operation in standby mode.

2. Description of the Conventional Art

With the development of electronic information equipment, such as mobile phones, portable devices such as laptop computers, and HDTVs, which deliver high-resolution, high-quality images, the demand for flat panel display devices applicable to this equipment is growing. Although there has been active research on LCDs (liquid crystal displays), PDPs (plasma display panels), FEDs (field emission displays), OLEDS (organic light emitting diodes), etc as these flat panel display devices, liquid crystal displays (LCDs) highlighted due to such reasons as mass-production technology, easiness of driving means, high resolution, and large-sized screen.

A liquid crystal display displays an image by controlling light transmittance through an electric field applied to a liquid crystal capacitor in response to an input data signal. The liquid crystal display includes a liquid crystal panel for displaying an image, drive circuits for driving the liquid crystal panel, and a backlight unit for illuminating the liquid crystal panel.

Particularly, the liquid crystal panel displays an image as the light transmittance of a plurality of pixels is controlled by drive circuits connected to the liquid crystal panel. In general, the drive circuits of the liquid crystal display include a gate driver that allows a thin film transistor to conduct electricity by applying a gate drive signal to a gate line formed on the liquid crystal panel, a data driver that charges pixels by applying an analog waveform data signal to one electrode of the electrically conducting thin film transistor, and a timing controller that controls the two drivers.

FIG. 1 is a view schematically showing a data driver, one of the drive circuits of a conventional liquid crystal display device.

Among these drive circuits, the data driver consists of a plurality of data drive ICs. A data drive IC includes a shift register 2, a latch block 4, a DAC (digital analog converter) 6, and an output buffer 8, and converts input digital waveform image data into an analog waveform data signal in response to a data control signal output from the timing controller, outputs the analog waveform data signal to the liquid crystal panel, and allows the liquid crystal panel to display an image in response to this signal.

However, the liquid crystal display device is not capable of display images and colors while it is running in standby mode when all power is cut off, except when an input signal is received by remote control the viewer, rather than running in normal mode in which normal images are displayed. Hence, the viewer sees only black. As a result, the wall with the liquid crystal display device mounted on it is vastly covered in black, especially if it is large-sized, which does not blend in well with its surroundings and is not desirable from an aesthetic point of view.

Accordingly, there has been proposed a method of displaying a predetermined image in a repeating fashion for a long period of time, like in an electronic picture frame. However, this method is of no practical benefit for power saving since the power consumption of liquid crystal displays is increasing with the trend toward large-area liquid crystal displays and running an electronic picture frame therefore consumes the same amount of power as running a liquid crystal display in normal mode.

To overcome this limitation, there has been proposed a method of minimizing power consumption and improving interior functionality by displaying, during standby mode, a single color screen or a striped screen where a predetermined number of stripes shift on a regular basis, rather than displaying normal images.

However, even the single color screen or stripe screen consumes a larger amount of power than keeping the screen in black. Especially, the power consumption of analog circuits, i.e., the latch block 4, DAC 6, and output buffer 8, which constitute the data driver is 70% of the total power consumption of the liquid crystal display during standby mode, and therefore there is a need for a method to further lower the power consumption of the data driver.

SUMMARY

A liquid crystal display device includes: a liquid crystal panel where a plurality of gate lines and data lines cross over each other and pixels are defined at the crossing points; a gate driver that sequentially outputs a gate drive signal to the gate lines; a data driver that converts input image data into an analog waveform data signal and outputs the same; and a timing controller that controls the gate driver and the data driver so that a normal image corresponding to image data provided from the outside is displayed on the liquid crystal panel during normal mode and a standby screen image corresponding to a data signal generated by a built-in standby mode controller is displayed during standby mode.

The data driver and the liquid crystal display device including the same according to the embodiment of the present invention further include a standby mode controller which is provided in the timing controller, in addition to the usual data driver, and runs in standby mode to perform the standby mode function with minimum power consumption.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE EXEMPLARY EMBODIMENTS

Hereinafter, a liquid crystal display device according to a preferred embodiment of the present invention will be described with reference to the accompanying drawings. The liquid crystal display device according to the embodiment of the present invention runs differently in normal mode and standby mode.

The normal mode is a mode that displays an image by writing image data input from an external system for each frame in pixels of a liquid crystal panel. In the normal mode, a data driver outputs an analog waveform signal corresponding to input digital image data, and gate driver sequentially outputs a gate drive signal for each frame.

In the standby mode, power is supplied to the liquid crystal display device, but consumes only a small amount (1 W or less) of power enough to communicate with a user interface device such as a remote control, displays no data regarding an image input from the outside, and outputs only a single color image or striped image that shifts in one direction, which is generated by a stand mode controller.

Figure 1:
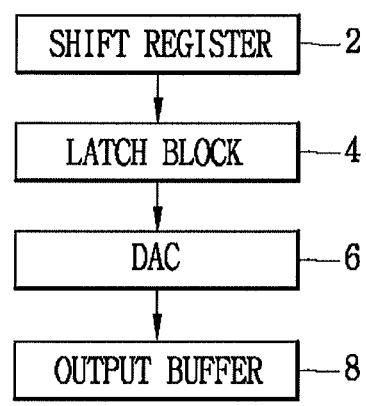
FIG. 1 is a view schematically showing a data driver, one of the drive circuits of a conventional liquid crystal display device.
Figure 2:
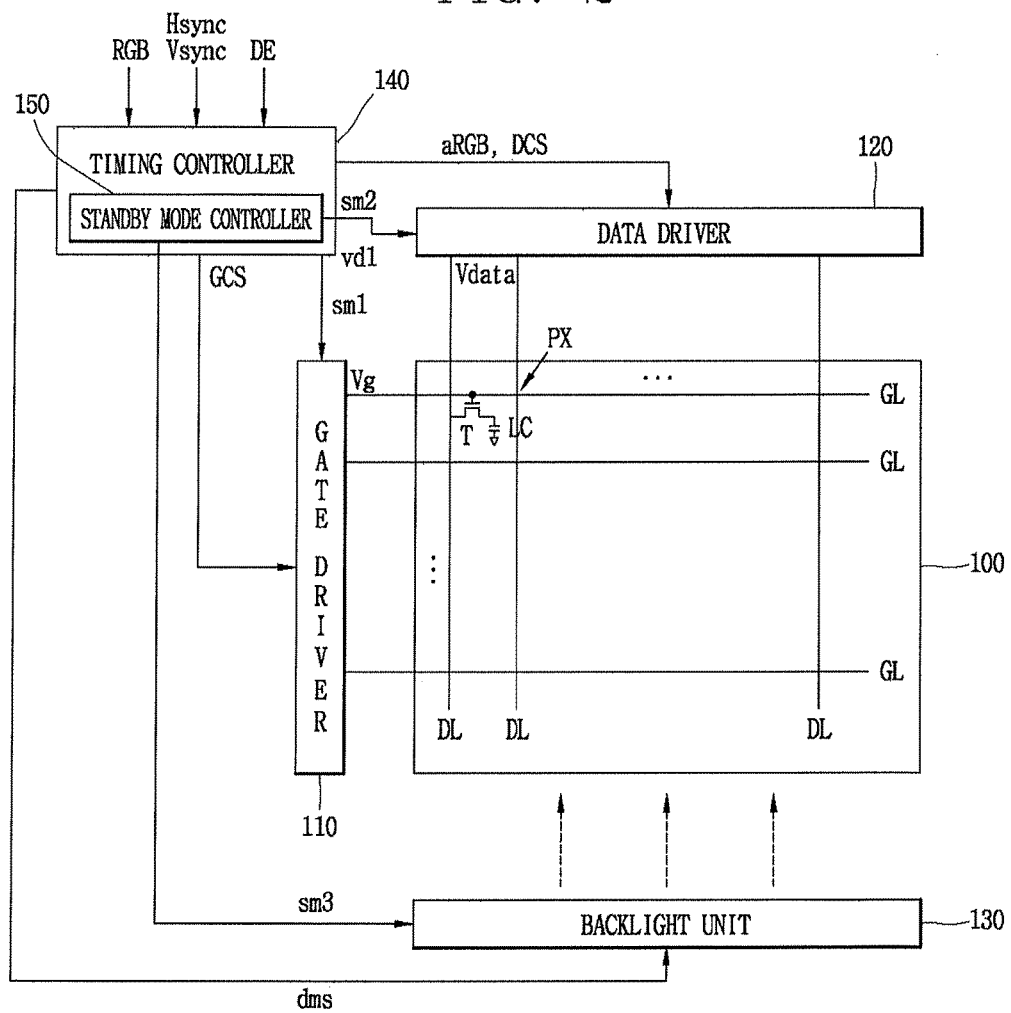
FIG. 2 is a view showing the overall structure of a liquid crystal display device according to a first embodiment of the present invention.

FIG. 2 is a view showing the overall structure of a liquid crystal display device according to a first embodiment of the present invention.

Referring to FIG. 2, the liquid crystal display device according to the first embodiment includes a liquid crystal panel 100 where a plurality of gate lines GL and data lines DL cross over each other and pixels are defined at the crossing points, a gate driver 110 that sequentially supplies a gate drive signal VG to the gate lines GL, a data driver 120 that converts image data aRGB into an analog waveform data signal Vdata and outputs it, and a timing controller 140 that controls the gate driver 110 and the data driver 120 so that a normal image corresponding to image data RGB provided from the outside is displayed on the liquid crystal panel 100 during normal mode and a standby screen image corresponding to a data signal Vdata generated by a built-in standby mode controller 150 is displayed during standby mode.

The liquid crystal panel 100 has a plurality of gate lines GL and a plurality of data lines DL crossing over each other in a matrix on a transparent substrate and a plurality of pixels PX defined at the crossings. The gate lines GL are connected to the gate driver 110, and the data lines DL are connected to the data driver 140. Each pixel PX includes a thin film transistor T, i.e., a switching element.

A gate electrode of the thin film transistor T is connected to the gate lines GL, and a source electrode of the thin film transistor T is connected to the data lines DL. A drain electrode of the thin film transistor T is connected to a pixel electrode of a liquid crystal capacitor LC and one electrode of a storage capacitor (not shown) to define a single pixel PX.

With this structure, the thin film transistors T conduct electricity in response to a signal input into each line, and a data signal Vdata corresponding to an image is applied to each pixel PX, thereby causing the liquid crystal panel 100 to display the image.

The gate driver 110 controls the on/off of the thin film transistors T arranged on the liquid crystal panel 100 in response to gate control signals GCS input from the timing controller 140. An output end of the gate driver 110 is connected to the gate lines GL on the liquid crystal panel 100. By this, a gate drive signal Vg is sequentially output every horizontal line to turn on the thin film transistors T, which are switching elements, so that a data signal Vdata output from the data driver 120 is applied to the liquid crystal capacitors LC respectively connected to thin film transistors T.

The above-mentioned gate control signals GCS include a gate start pulse GSP, a gate shift clock (GSC), and a gate output enable signal (GOE). The gate start pulse GSP is a signal that is applied to a first gate pulse generating shift register and controls the shift register to generate the first gate pulse. The gate shift clock GSC is a clock signal that is commonly input into all the shift registers and shifts the gate start pulse GSP. The gate output enable signal GOE serves to control the output of the shift registers.

The data driver 120 latches input digital image data aRGB for one horizontal line in response to data control signals DCS input from the timing controller 140, and converts it into an analog data signal Vdata using a reference voltage. The data signal Vdata is input into the liquid crystal panel 100 simultaneously through all the data lines DL in synchronization with the gate drive signal Vg.

The above-mentioned data control signals DCS include a source start pulse (SSP), a source sampling clock (SSC), a polarity control signal (POL), and a source output enable signal (SOE). The source start pulse SSP is a signal that controls the start timing of data sampling, and the source sampling clock SSC is a clock signal that controls the timing of data sampling of each data drive IC constituting the data driver 120 in response to a rising or falling edge. The polarity control signal POL controls the timing of vertical polarity inversion of data signals simultaneously output from the data drive ICs. The source output enable signal SOE serves to control the output timing of the data driver 120.

The backlight unit 130 is located on one side of the liquid crystal panel 100 to illuminate it. The backlight unit 130 includes one or more fluorescent lamps or an LED package and a drive circuit controlling the package.

The timing controller 140 receives image data RGB applied from the outside and predetermined timing signals Hsync, Vsync, and DE, aligns the image data RGB in a form that can be processed by the data driver 120, and generates gate and data control signals GCS and DCS and apply them to the drivers 110 and 120. Also, the timing controller 140 generates a backlight control signal dms for dimming control according to the on/off status of the LED package and a displayed image.

The horizontal synchronization signal Hsync is a signal that defines the time taken to display an image corresponding to one horizontal line of the screen, and the vertical synchronization signal Vsync is a signal that defines the time taken to display the screen for a single frame. The data enable signal DE is a signal that defines the period of time during which a pixel voltage is supplied to the pixel electrodes of the liquid crystal panel 100.

The timing controller 140 incorporates the standby mode controller 150 that controls each driver in different ways depending on which driving mode the liquid crystal display device runs in.

When the liquid crystal display device is currently in normal mode, the standby mode controller 150 is disabled and the timing controller 140 allows the liquid crystal display device to display an image through a normal driving process. When the liquid crystal display device is current in standby mode, a processing circuit embedded in the timing controller 140 is disabled and instead the timing controller 140 generates a control signal having a waveform for standby mode, which is different from normal mode, and applies it to the drivers 110, 120, 130, so that a single color image or a shifting striped image, rather than a black grayscale image, is displayed even in standby mode. The driving mode of the liquid crystal display device can be detected depending on whether a timing signal and image data have been received from an external system or not.

During normal mode, the standby mode controller 150 is disabled, and the timing controller 140 receives a control signal and an image signal from an external system 110 and aligns and converts them. In response to these signals, the standby mode controller 150 controls the gate driver 110 to generate a gate drive signal and output a data signal to the pixels by turning on/off the thin film transistors on the liquid crystal panel 100, thus turning on the backlight unit 130.

On the other hand, during standby mode, the standby mode controller 150 disables a timing control processor incorporated in the timing controller 140, generates first and second control signals sm1 and sm2 to allow the gate driver 110 to output a high-level gate drive signal to all the gate lines GL, and generates image data corresponding to a single color image or striped image for one horizontal line to supply it to the data driver 120, thus outputting the single color image or striped image through the pixels.

Moreover, the standby mode controller 150 generates a third control signal sm3 to drive the backlight unit 130 at low luminance in a way that consumes as small power as possible.

That is, the liquid crystal display device further includes a standby mode controller which is provided in the timing controller and generates a control signal and image data for standby mode, rather than displaying an image using a control signal and image data generated by the timing controller during standby mode according to the conventional art. Thus, a standby mode screen can be displayed with lower power consumption compared to the conventional art.

Hereinafter, the timing controller provided in the liquid crystal display device according to the embodiment of the present invention will be described with reference to the drawings.

Figure 3:
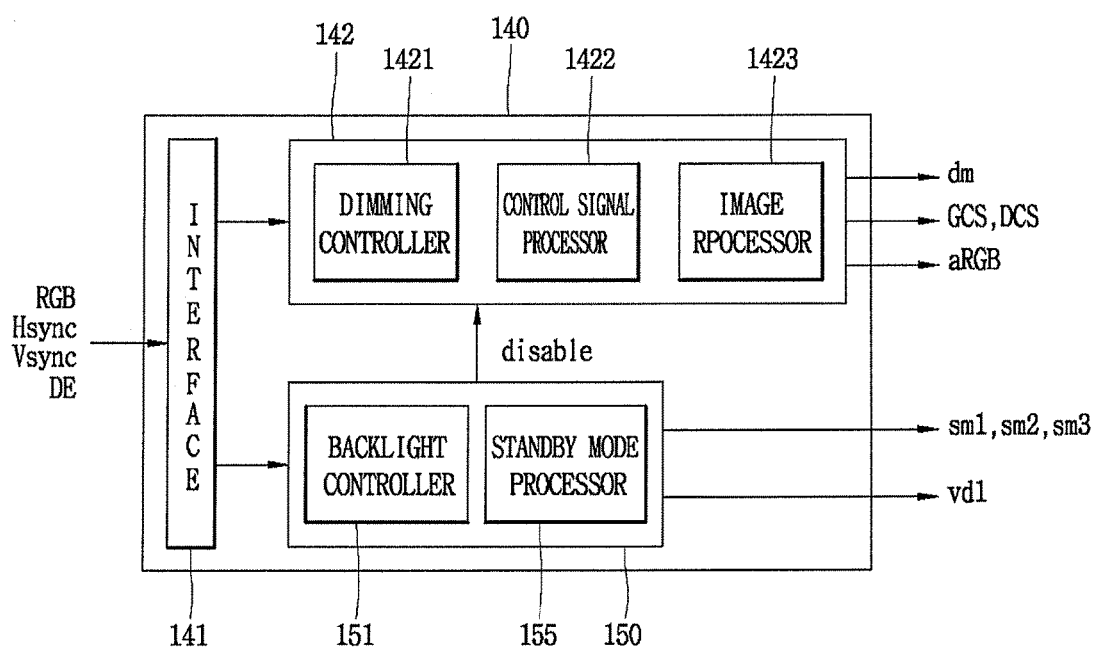
FIG. 3 is a view showing the structure of the timing controller of a liquid crystal display device according to an embodiment of the present invention.

FIG. 3 is a view showing the structure of the timing controller of the liquid crystal display device according to an embodiment of the present invention.

Referring to FIG. 3, the timing controller of the present invention includes an interface 141 connected to an external system (not shown), a control and image processor 142 that generates a control signal for controlling each driver in normal mode and allows the liquid crystal panel to display a normal image, and a standby mode controller 150 that replaces the control and image processor 142 to allow the liquid crystal panel to display a standby screen image in standby mode.

The interface 141 is connected to the external system (not shown) and transmits various timing signals Hsync, Vsync, and DE and image data RGB at high speed without errors, and may use low-voltage differential signaling LVDS. The signals transmitted from the interface 141 is input into the control and image processor 142 and the standby mode controller 150. If some or all of the timing signals input from the interface 141 are omitted, the standby mode controller 150 can determine that the current driving mode is standby mode.

The control and image processor 142 receives timing signals such as the horizontal synchronization signal Hsync, vertical synchronization signal Vsync, and data enable signal DE, and generates and outputs control signals GCs, DCS, and DMS for the gate driver, data driver, and backlight unit. Also, the control and image processor 142 receives image data RGB, and converts and aligns the image data RGB in a form that can be processed by the data driver. To this end, the control and image processor 142 includes a dimming controller 1421 that generates the backlight control signal DMS for turning on/off and dimming the backlight unit, a control signal processor 1422 that generates the gate and data control signals GSC and DSC, and an image processor 1423 that aligns and converts the image data RGB and outputs the converted image data aRGB to the data driver.

If the liquid crystal display device is found to be running in standby mode, the standby mode controller 150 sends a request to disable the control and image processor 142, generates control signals sm1, sm2, and sm3 for the gate driver, data driver, and backlight unit, and generates image data corresponding to a single color image and outputs it to the drivers and the backlight unit.

If a single color image is displayed during standby mode, the gate control signal sm1 is a signal that allows for outputting a high-level gate drive signal through all the gate lines, and the data control signal sm2 is a signal that allows for maintaining a data signal corresponding to one horizontal line for 1 frame. The backlight control signal sm3 is a signal that allows for low-power-consumption driving of the backlight unit at a minimum luminance.

If a shifting striped image is displayed during standby mode, the gate control signal sm1 is a signal that allows for sequentially outputting a high-level gate drive signal through the gate lines, as in the conventional art, and the data control signal sm2 is a signal that allows for maintaining a data signal corresponding to one horizontal line for 1 frame and then shifting and maintaining it for the next frame. The backlight control signal sm3 is a signal that allows for low-power-consumption driving of the backlight at a minimum luminance.

To this end, the standby mode controller 150 includes a backlight controller 151 that generates the backlight control signal sm3 for standby mode operation and a standby mode processor 155 that generates the gate and data control signals sm1 and sm2 and generates image data vd1 corresponding to one horizontal line.

Figure 4A:
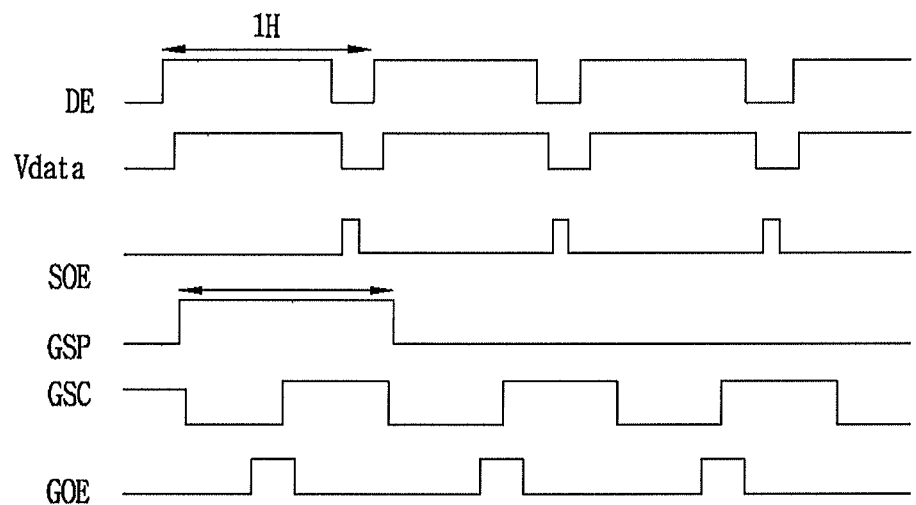
FIG. 4A is a view showing the signal waveforms of parts of control signals during normal mode of the liquid crystal display device according to the first embodiment of the present invention.
Figure 4B:
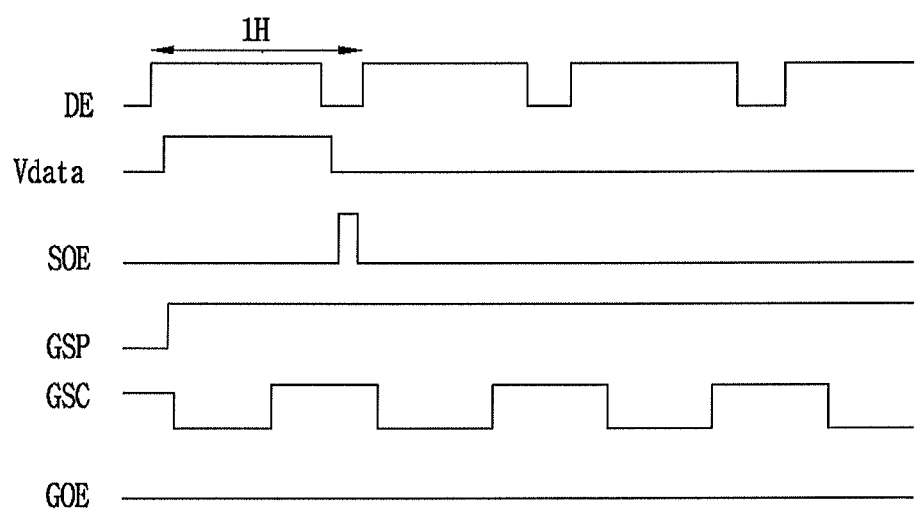
FIG. 4B is a view showing the signal waveforms of parts of control signals during standby mode.

FIG. 4A is a view showing the signal waveforms of parts of control signals during normal mode of the liquid crystal display device according to the first embodiment of the present invention. FIG. 4B is a view showing the signal waveforms of parts of control signals during standby mode.

Referring to FIGS. 4A and 4B, in normal mode, when 1 horizontal period 1H is defined by an output enable signal DE, the gate start pulse GSP has one initial high-level section within one frame and the gate driver sequentially outputs a high-level gate drive signal to the gate lines in synchronization with the gate start pulse GSP. Also, the gate shift clock GSC is output at high level every horizontal period to designate a stage for directly outputting a gate drive signal. The gate output enable signal GOE is output at high level between the output of the gate drive signal of each horizontal line to define the output timing of preceding and subsequent gate drive signals.

Moreover, the data driver outputs the data signal Vdata every horizontal period, and the source output enable signal SOE is output at high level between the output of the data signal of each horizontal line to define the output timing of data signals Vdata corresponding to previous and subsequent horizontal lines.

In contrast, in standby mode, when 1 horizontal period 1H is defined by an output enable signal DE, the gate start pulse GSP has a continuous high-level section to output a high-level gate drive signal through all the gate lines, the gate output enable signal GOE is maintained at low level so as not to define the output timing of previous and subsequent gate drive signals, and a voltage level of all the gate lines is controlled to keep outputting the high-level gate drive signal. Also, the gate shift clock GSC is output at high level every horizontal period, as in the conventional art, to designate a stage for directly outputting the gate drive signal.

Moreover, the data driver outputs only the data signal Vdata corresponding to a horizontal period, and the source output enable signal SOE only defines the end timing of the data signal corresponding to the horizontal period and keeps the same data signal Vdata for 1 frame or more in the next horizontal period. Accordingly, when displaying a single color image, the data driver maintains the previous status except during 1 horizontal period and does not refresh the data signal Vdata. Thus, the power consumption of the data driver is reduced.

In the first embodiment, the standby mode controller generates image data corresponding to one horizontal line, and the data driver converts the image data into a data signal and outputs it for 1 frame or more without refreshing the data signal, thereby displaying a single color image and leading to a reduction in power consumption.

Hereinafter, second and third embodiments for displaying a striped image screen where a striped image shifts in one direction will be described with reference to the drawings.

Figure 5:
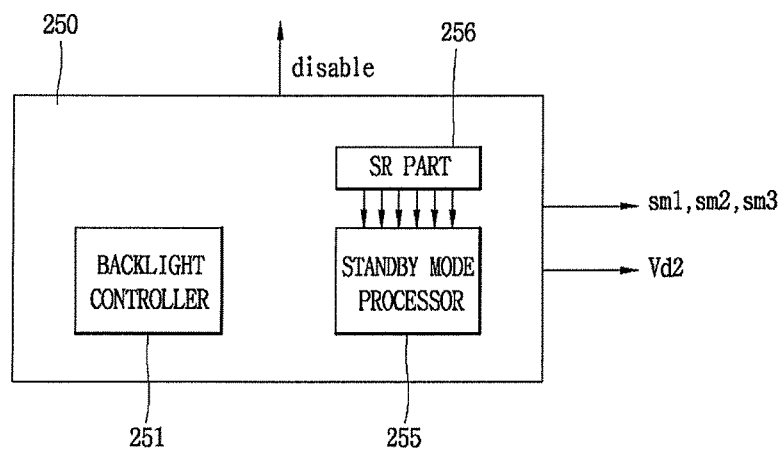
FIG. 5 is a view showing the structure of the standby mode controller incorporated in the timing controller of a liquid crystal display device displaying a striped image screen that shifts during standby mode according to a second embodiment of the present invention.

FIG. 5 is a view showing the structure of the standby mode controller incorporated in the timing controller of a liquid crystal display device displaying a striped image screen that shifts in standby mode according to a second embodiment of the present invention.

Referring to FIG. 5, if the liquid crystal display device is found to be running in standby mode, the standby mode controller 250 according to the second embodiment of the present invention sends a request to disable the control and image processor 142, generates control signals sm1, sm2, and sm3 for the gate driver, data driver, and backlight unit, and generates image data corresponding to a shifting striped image and outputs it to the drivers and the backlight unit.

A striped image is displayed during standby mode. The gate control signal sm1 is a signal that allows for sequentially outputting a high-level gate drive signal through the gate lines, as in the conventional art, and the data control signal sm2 is a signal that allows for maintaining a data signal corresponding to one horizontal line for 1 frame and then shifting and maintaining it for the next frame. The backlight control signal sm3 is a signal that allows for low-power-consumption driving of the backlight at a minimum luminance.

To this end, the standby mode controller 250 includes a backlight controller 251 that generates the backlight control signal sm3 for standby mode operation, a standby mode processor 255 that generates the gate and data control signals sm1 and sm2 and generates image data vd1 corresponding to one horizontal line, and an SR unit 256 that shifts image data corresponding to one horizontal line generated by the standby mode processor 255 by a predetermined distance every frame.

When the striped image generated by the standby mode processor 255 forms a single screen, that is, an image for 1 frame is displayed, the SR unit 256 serves to shift the pattern in one direction in the next frame and let the viewer to perceive the image as shifting. The SR unit 256 may be implemented as a shift register that shifts image data corresponding to 1 horizontal line to the left or right.

While the image data shifting process in the second embodiment is performed by the standby mode processor 255 incorporated in the timing controller, the following third embodiment is different from the second embodiment in that the image data shifting process is performed by the data driver.

Hereinafter, a liquid crystal display device according to the third embodiment of the present invention will be described with reference to the drawings.

Figure 6:
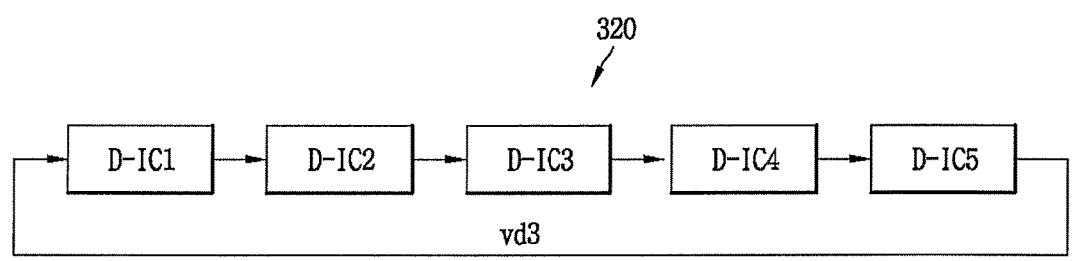
FIG. 6 is a view showing the structure of a data driver of a liquid crystal display device according to a third embodiment of the present invention.
Figure 7:
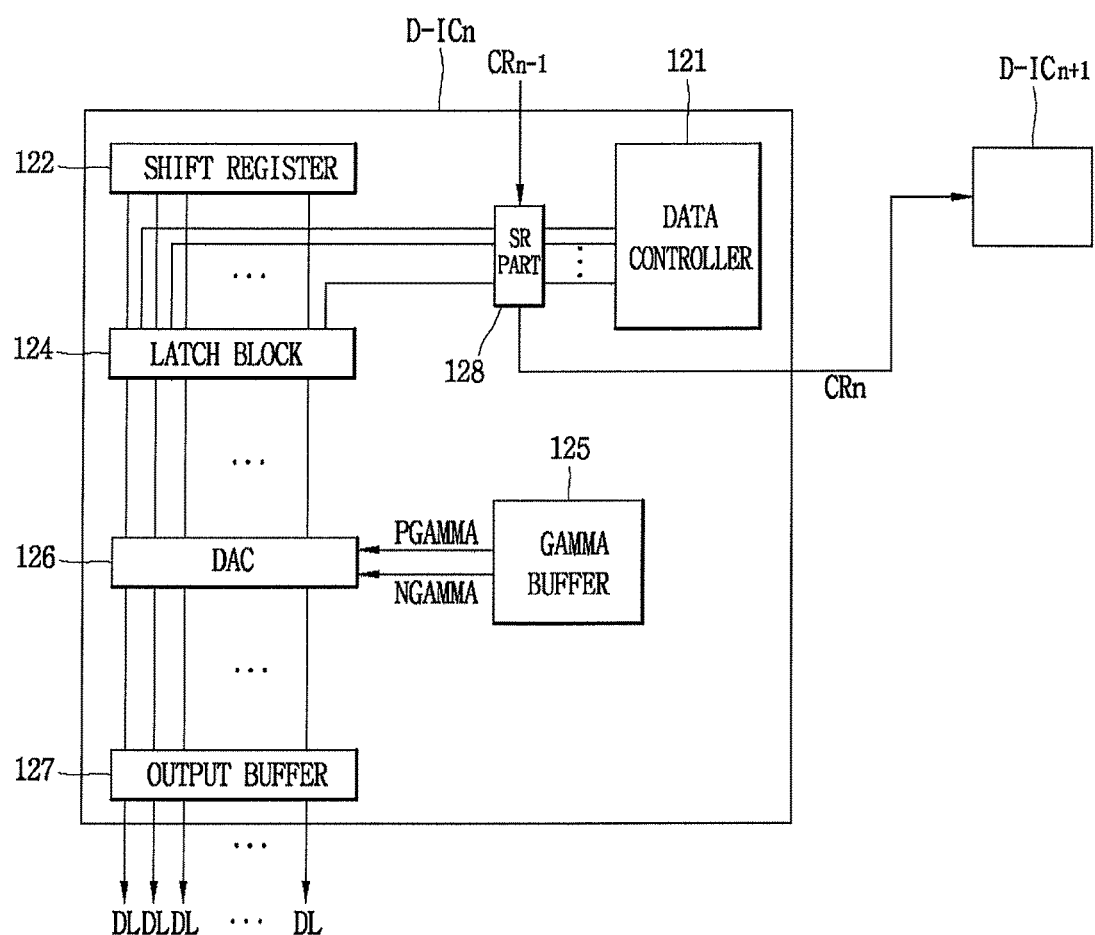
FIG. 7 is a view showing the structure of a single data drive IC constituting the data driver of FIG. 6.

FIG. 6 is a view showing the structure of a data driver of a liquid crystal display device according to a third embodiment of the present invention. FIG. 7 is a view showing the structure of a single data drive IC constituting the data driver of FIG. 6.

Referring to FIG. 6, the data driver 320 of the liquid crystal display device according to the third embodiment of the present invention consists of a plurality of data drive ICs D-IC1 to D-IC5. The first data drive IC D-IC1 receives initial image data for one horizontal line and passes the image data to the next data drive IC D-IC2. Next, when image data for all horizontal lines are passed down to the last data drive IC D-IC5, image data for one horizontal line is output and maintained for 1 frame. Then, image data vd3 for a striped image that has shifted from the fifth data drive IC D-IC5 immediately before the start of the next frame is input again into the first data drive IC D-IC1, thereby displaying an image.

That is, according to the third embodiment of the present invention, image data input or generated by one data drive IC D-ICn (1≤n≤5) is passed to the next data drive IC D-ICn+1 to form image data for one horizontal line, and the image data is maintained for 1 frame or more, thereby displaying a striped image. Afterwards, when shifting the striped image, the last data drive IC D-IC5 passes a shift-carry for the image data to the first data drive IC D-IC1 to shift and output latched image data, rather than refreshing the striped image, thereby displaying a shifting striped image.

FIG. 7 is a view showing the structure of any one of the data drive ICs of FIG. 6. Referring to FIG. 7, a data drive IC D-ICn of the data driver includes a data controller 121 that sequentially outputs image data, a latch block 124 that latches the output image data so as to correspond to one horizontal line, a gamma buffer 125 that supplies a positive or negative polarity gamma voltage, a DAC (digital-analog converter) 126 that converts the latched image data corresponding to the gamma voltage into an analog waveform and generates a data signal Vdata, an output buffer 127 that outputs the data signal Vdata to each data line DL, and an SR unit 128 that shifts the image data output from the data controller 121 by a predetermined distance in response to a previous carry signal CRn−1 and passes a carry signal CRn to the next data drive IC D-ICn+1.

The data controller 121 receives data control signals DCS from a timing controller (not shown) and controls the components 122, 124, 125, 126, and 127. Particularly, the data controller 121 sequentially outputs input image data or self-generated image data to the latch block 124.

The shift register 122 passes image data sequentially input in response to some of the data control signals DCS, i.e., the source start pulse SSP and the source sampling clock SSC, so as to correspond to 1 horizontal line.

The latch block 124 latches input image data, and when image data for 1 horizontal line is latched, outputs it to the DAC 126. Unlike the conventional data driver, the latch block 124 operates to configure a single screen every horizontal line without renewing image data by keeping the current latched image data for at least 1 frame, rather than latching image data corresponding to the next horizontal line after the output of image data for 1 horizontal line.

Next, the gamma buffer 125 supplies positive and negative polarity gamma voltages P-GAMMA and N-GAMMA to the DAC 126.

The DAC 126 converts digital waveform image data for 1 horizontal line output from the latch block 124 into positive and negative polarity analog data using the positive and negative polarity gamma voltages P-GAMMA and N-GAMMA, and outputs it to the output buffer 127. To this end, the DAC 126 may include positive and negative polarity decoders (not shown) commonly connected to the latch block 124 and a multiplexer for selecting output signals from the two decoders.

The output buffer 127 includes a plurality of voltage followers, which are respectively connected to the data lines DL and supply an analog data signal Vdata output from the DAC 126 to the pixels of the liquid crystal panel.

The SR unit 128 is connected between the data controller 121 and the latch block 124. When the timing at which a striped image shifts in one direction in response to the currently output data signal Vdata, the SR unit 128 shifts the image data output from the data controller 121 in response to the carry signal CRn−1, thereby shifting the image data corresponding to 1 horizontal line and latched by the latch block 124. Also, the SR unit 128 passes the carry signal CRn to the next data drive IC D-ICn+1 to have the data drive IC D-ICn+1 refresh the latched data, thereby shifting the striped image pattern on the entire screen.

Accordingly, when displaying a striped image, image data is generated and refreshed within the data driver, rather than being generated and refreshed each time. This results in reduced power consumption.

Although the above descriptions are specific, they should not be considered as limitations on the scope of the invention, but only as examples of the preferred embodiment. Thus the scope of this invention should be determined by the appended claims and their legal equivalents, rather than by the specific examples given.

What is claimed is:

1. A liquid crystal display device comprising:
   a timing controller configured to receive input image data and timing signals from outside the device, the timing controller including a control and image processor having a dimming controller and a standby mode controller having a backlight controller;
   a liquid crystal panel where a plurality of gate lines and data lines cross over each other and pixels are defined at crossing regions;
   a gate driver that sequentially outputs a gate drive signal to the gate lines; and,
   a data driver that converts the input image data into an analog waveform data signal and outputs the analog waveform data signal to the data lines,
   wherein, in a normal mode, the control and image processor of the timing controller controls the gate driver and the data driver so that a normal image corresponding to external input image data and timing signals provided from outside the device is displayed on the liquid crystal panel, and the dimming controller generates and outputs a first backlight control signal, and in a standby mode, the standby mode controller generates a disable signal to disable the control and image processor, the backlight controller generates and outputs a second backlight control signal, and a standby screen image corresponding to data for one horizontal line stored in the standby mode controller is displayed during the standby mode,
   wherein the standby mode is entered when less than all of the timing signals from outside the device are received, the stored data corresponding to the one horizontal line is provided to the data driver to display a standby screen image for at least 1 frame, and the standby screen image is refreshed after the at least 1 frame, without external image data input.

2. The liquid crystal display device of claim 1, wherein the standby screen image is a single color image.

3. The liquid crystal display device of claim 1, wherein the standby screen image is a striped image with single color stripes shifting in one direction.

4. The liquid crystal display device of claim 1, wherein the standby mode controller allows the gate driver to output a high-level gate drive signal simultaneously for all the gate lines during the standby mode.

5. The liquid crystal display device of claim 4, wherein the standby mode controller further comprises a shift register (SR) unit that shifts a striped image corresponding to the one horizontal line in one direction.

6. The liquid crystal display device of claim 4, wherein the data driver includes a plurality of data drive integrated circuits (ICs), and the data drive ICs further comprise a shift register (SR) unit that shifts a striped image corresponding to the one horizontal line and input into a first data drive IC, in response to a carry signal, and passes the striped image corresponding to one horizontal line to a next data drive IC.

7. The liquid crystal display device of claim 4, wherein data control signals from the data driver comprise a source output enable signal that has one high-level section at an end timing of a data signal corresponding to 1 horizontal line.

8. The liquid crystal display device of claim 1, wherein, in the normal mode, gate control signals from the gate driver comprise:
   a gate start pulse signal that has one initial high-level section within one frame;
   a gate output enable signal that has a high-level section each horizontal period; and
   a gate shift clock signal that has a regular high-level section every horizontal period.

9. The liquid crystal display device of claim 1, wherein, in the standby mode, gate control signals from the gate driver comprise:
   a gate start pulse signal that has a continuous high-level section within one frame;

a gate output enable signal that is maintained at low level; and a gate shift clock signal that has a regular high-level section every horizontal period.

10. The liquid crystal display device of claim 1, wherein, in the standby mode, the data driver converts the data signal into an analog waveform data signal and outputs the analog waveform data signal to the data lines for 1 or more frames without refreshing the data signal.

11. The liquid crystal display device of claim 10, wherein the standby screen image is comprised of stripes.

12. A device, comprising:
a display panel including a plurality of gate lines, a plurality of data lines, and a plurality of pixels;
a backlight unit;
a gate driver coupled to the plurality of gate lines; and
a timing controller, including:
 a control and image processor coupled to the gate driver, the control and image processor including a dimming controller, and
 a standby mode controller coupled to the gate driver, the standby mode controller including a backlight controller,
wherein, in a normal mode of operation, the control and image processor outputs first control signals to the gate driver, the gate driver outputs first gate drive signals to the plurality of gate lines based on the first control signals, and the dimming controller generates a first backlight control signal and outputs the first backlight control signal to the backlight unit, and
wherein, in a standby mode of operation, the standby mode controller transmits a disable signal to the control and image processor, outputs second control signals to the gate driver, the gate driver outputs second gate drive signals to the plurality of gate lines based on the second control signals, and the backlight controller generates a second backlight control signal and outputs the second backlight control signal to the backlight unit.

13. The device of claim 12, further comprising:
a data driver coupled to the timing controller and to the plurality of data lines,
wherein, in the normal mode, the control and image processor receives image data from an external system, and controls an output of the data driver based on the received image data, and
wherein, in the standby mode, the standby mode controller generates image data and controls an output of the data driver based on the generated image data.

14. The device of claim 13, wherein in the standby mode, the standby mode controller generates the image data corresponding to a single color image.

15. The device of claim 13, wherein in the standby mode, the standby mode controller generates the image data corresponding to a striped image for one horizontal line.

16. The device of claim 13,
wherein, in the standby mode, the backlight controller drives the backlight unit at a reduced luminance level based on the second backlight control signal.

17. The device of claim 12, wherein the gate driver outputs the second gate drive signals having a continuous high-level for a duration of the standby mode of operation.

18. The device of claim 1, further comprising a backlight unit, wherein the dimming controller drives the backlight unit in the normal mode based on the first backlight control signal, and the backlight controller drives the backlight unit in the standby mode based on the second backlight control signal.

* * * * *